United States Patent Office 3,829,413
Patented Aug. 13, 1974

3,829,413
OZONOLYSIS OF ACETALS
Pierre Deslongchamps, Sherbrooke, Quebec, Canada, assignor to Universite de Sherbrooke, Sherbrooke, Quebec, Canada
No Drawing. Filed July 2, 1971, Ser. No. 159,475
Int. Cl. C07c 47/18, 69/32
U.S. Cl. 260—210 R                              13 Claims

ABSTRACT OF THE DISCLOSURE

There is provided a process for converting cyclic and acyclic acetals to esters by ozonolysis.

---

The present invention relates to a novel method for preparing esters and more particularly for preparing esters from acetals.

Heretofore, esters have generally been prepared by any of the following methods. Esters could be obtained by refluxing acid with excess alcohol in the presence of an acid catalyst, thereby to eliminate a molecule of water. It is also known to use a cation ion exchange resin to catalyse the esterification. Rather than use the free acid, the corresponding acid anhydride or acid chloride can also be used. Further esterification can also be obtained by reacting a silver salt of an acid with an alkyl halide. It is also known that when methyl esters are desired these can be prepared by treating the acid with an ethereal solution of diazomethane. Finally, esters can be obtained by transesterification (ester interchange) whereby a new ester is formed by allowing an ester of an alcohol to react with an excess of a second alcohol.

Acetals are known and are normally derived from aldehydes which are members of an important class of organic compounds. Aldehydes are intermediaries between alcohols and acids and thus can become an important source in preparing esters. Heretofore there has not been provided any general method for converting acetals into esters.

In accordance with the present invention it has now been found that esters can be prepared from acetals in very high yields. Broadly, the novel method for preparing esters comprises subjecting acetals to the oxidative action of ozone. More specifically, the method comprises reacting cyclic or acyclic acetals with ozone to form the appropriate ester.

The acetals which can be used to prepare esters in accordance with the present invention correspond to the following general formula:

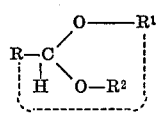

wherein

R and $R^1$ can be independent radicals selected from alkyl, substituted alkyl, aryl, aralkyl, cycloalkyl, and $R^2$ is the same as $R^1$; and
$R^1$ and $R^2$ may form an alkylene chain and the alkylene chain may be substituted; and
R and $R^2$ may form an alkylene chain and the alkylene chain may be substituted.

As an example of the possible substituents for R, $R^1$ and $R^2$ there may be mentioned alkyl, such as methyl, ethyl, propyl, isopropyl, butyl, isobutyl, pentyl, hexyl, nonyl, etc., and these may be substituted by lower alkyl groups, halogen, lower alkoxy, hydroxy, phenyl, phenyl lower alkyl, etc.;
aryl, such as phenyl, naphthyl, styryl, etc.;
aralkyl such as benzyl, phenethyl, which may be substituted by substituents such as halo, hydroxy, alkyloxy, phenyl, etc.;
cycloalkyl such as cyclopropyl, cyclobutyl, cyclopentyl, cyclohexyl, etc.;
$R^1$ and $R^2$ may also form part of an alkylene chain which itself may form part of a cyclic ring wherein at least one of the atoms of the cyclic ring may be a hetero atom such as oxygen and such a structure may be illustrated as follows:

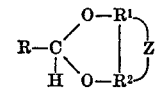

wherein Z stands for a member such as

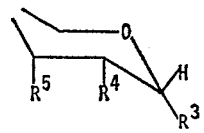

wherein $R^3$, $R^4$ and $R^5$ may be hydrogen, alkyl, alkoxy, aryl, aryloxy, aralkyl, aralkoxy, cycloalkyl or cycloalkoxy.

When $R^1$ and $R^2$ are not linked together and are the same and when R and $R^2$ are not linked together, the acetal is ozonized to the ester according to the following reaction:

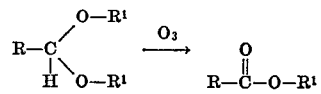

The reaction can also take place when $R^1$ and $R^2$ are different but from a practical point of view this is not an advantage, since mixed esters of $R^1$ and $R^2$ will then be obtained and will have to be separated if the respective esters are desired. Also the occurrence of mixed acetals, that is where $R^1$ and $R^2$ are different is fairly rare because it is a most difficult problem to prepare mixed acetals.

When $R^1$ and $R^2$ form an alkylene chain, the cyclic acetal is ozonized to the ester according to the following reaction:

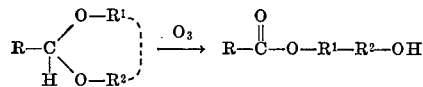

When $R^1$ and $R^2$ form a substituted alkylene chain which itself forms part of a ring, the cyclic acetal will be ozonized to the ester according to the following reaction:

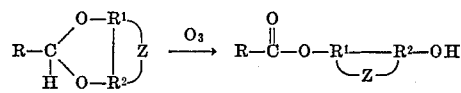

wherein $R^1$, $R^2$ and Z are as previously defined.

When R and $R^2$ form an alkylene chain the cyclic acetal is ozonized according to the following reaction:

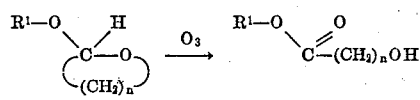

$n = 2$–$5$.

When $n$ is 4 there is formed a tetrahydropyranyl ring and the use of the tetrahydropyranyl ring in chemical reactions is well known to be important in the protection of a functional group in certain chemical transformations. This group, the tetrahydropyranyl grouping, is very often used as a protecting group for the hydroxyl function. It is normally removed by aqueous acid treatment, but in accordance with the present invention treatment of the tetrahydropyranyl protecting group with ozone will provide a hydroxy ester from which the protected alcohol can be regenerated by basic hydrolysis or simply by heating.

Another feature of the present invention is in the removal of protecting groups for 1,2 or 1,3 diols. Normally such diols are protected by conversion to alkylidene acetal or arylidene acetal derivatives such as ethylidene or benzylidene and the regeneration of the diols is performed by aqueous acid treatment. In accordance with the present invention the removal of these blocking groups can now be accomplished by ozonolysis to give the monoester of the corresponding diol. If desired the parent diol can be regenerated by basic or acid hydrolysis. An advantage of the present invention is that the blocking group can be removed under non-acidic conditions and present a special advantage when treating molecules containing other acid labile groupings. It will therefore be readily seen that ozonolysis per se before hydrolysis provides a method for selective monoesterification of a diol. This method obviously presents an important advantage to differentiate two similar hydroxyl groups and thus provides obvious applications in carbohydrate chemistry. The ozonolysis of alkylidene or arylidene acetals may be illustrated as follows:

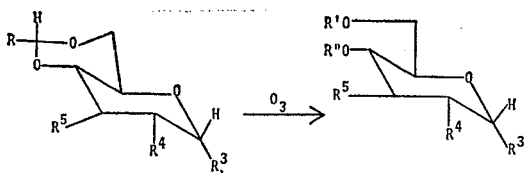

wherein R is alkyl or aryl and R′ is H when R″ is an alkanoyl such as $CH_3CO$ or $C_6H_5CO$ and R′ is an alkanoyl such as $CH_3CO$ or $C_6H_5CO$ when R″ is H, and $R^3$, $R^4$ and $R^5$ are as previously defined.

The ozonization is carried out at temperatures ranging from very low temperatures to warm temperatures for a period of time varying with the temperatures used and the type of acetal selected. For example, cyclic acetals will react with ozone at $-78°$ C. within two hours, whereas acyclic acetals will react with ozone at room temperature also within two hours. In certain cases the reaction can vary anywhere from ten minutes to fifteen hours.

The invention will be now more fully understood by referring to the following examples which are given to illustrate the invention rather than limit its scope.

EXAMPLE 1

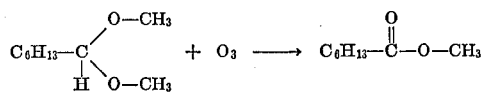

1,1-Dimethoxy heptane (3.71 g., 23.2 mmoles) dissolved in ethyl acetate (100 ml.) was ozonized for 90 minutes at room temperature. The excess ozone was swept away with a stream of nitrogen. After evaporation of the solvent, the crude product was taken up in ether, washed with 5% aqueous sodium carbonate, brine and dried over magnesium sulfate. Methyl heptanoate (b.p. 68° C./10 mm.) was obtained in 90.5% yield (3.0 g., 20.9 mmoles).

EXAMPLES 2-5

Employing the method described in Example 1, but substituting for 1,1-dimethoxy heptane used therein equivalent amounts of the acetals shown in Table I, there are produced according to Equation I the corresponding esters shown in Table I.

TABLE I

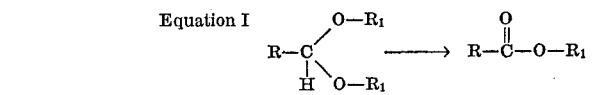

| Ex. | R | $R_1$ | Time, hrs. | Temp. (° C.) | Yield (percent) | Ester |
|---|---|---|---|---|---|---|
| 2 | $CH_3(CH_2)_5$— | $CH_3$ | 1.30 | 0 | 90 | $CH_3$—$(CH_2)_5$—$COOCH_3$ |
| 3 | $CH_3(CH_2)_5$— | $CH_3$ | 15 | −78 | 91 | $CH_3$—$(CH_2)_5$—$COOCH_3$ |
| 4 | $CH_3$—$(CH_2)_5$— | $C_2H_5$ | 8 | −78 | 99 | $CH_3(CH_2)_5$—$COOC_2H_5$ |
| 5 |  | $CH_3$ | 13 | −78 | 98 | 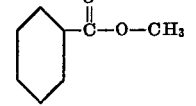 |

EXAMPLE 6

2-n hexyl-1,3-dioxolane (1.58 g., 10.0 mmoles) dissolved in redistilled ethyl acetate (100 ml.) was ozonized for 10 minutes at −78° C. The excess ozone was swept away with a stream of nitrogen while the reaction mixture was allowed to warm up to room temperature. After evaporation of the solvent, the crude product was taken up with ether, washed with brine, dried with magnesium sulfate and evaporated to dryness. 2-Hydroxyethyl heptanoate was obtained (1.77 g., 10.2 mmoles).

The above hydroxy ester was acetylated with pyridine (5 ml.) and acetic anhydride (5 ml.) at room temperature for 15 hours. After removal of excess reagent by evaporation *under vacuo,* the residue was dissolved in ether, washed with 5% aqueous sodium carbonate, brine, dried over magnesium sulfate and evaporated. Fractional distillation gave pure 2-acetoxy-ethyl heptanoate (2.12 g., 9.81 mmoles, 97.6% yield; b.p. 135° C./10 mm.).

*Analysis.*—Calculated: C, 61.09; H, 9.32. Found: C, 61.18; H, 9.59.

The reaction may be illustrated as follows:

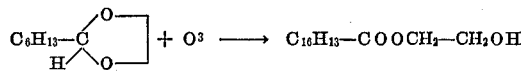

EXAMPLES 7-10

Employing the method described in Example 6, but substituting for n-hexyl-1,3-dioxolane used therein equivalent amounts of the acetals shown in Table II, there are produced according to Equation II the corresponding esters shown in Table II.

TABLE II

Equation II 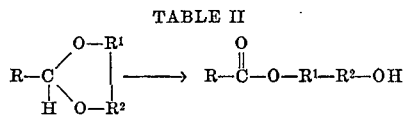

| Ex. | R | —R¹—R²— | Time | Temp. (° C.) | Yield (percent) | Ester |
|---|---|---|---|---|---|---|
| 7 | $CH_3(CH_2)_5$ | —$CH_2CH_2$— | 10 min | −78 | 100 | $CH_3(CH_2)5-\overset{O}{\underset{\|}{C}}-O-CH_2CH_2OH$ |
| 8 | $CH_3(CH_2)_5$ | —$CH_2CH_2CH_2$— | 2 hrs | −78 | 93 | $CH_2(CH_2)5-\overset{O}{\underset{\|}{C}}-O-CH_2CH_2CH_2OH$ |
| 9 | $CH_3(CH_2)5$ | —$CH_2-\underset{\underset{CH_3}{\|}}{\overset{\overset{CH_3}{\|}}{C}}-CH_2$— | 1 hr | −78 | 99 | $CH_3(CH_2)_5-\overset{O}{\underset{\|}{C}}-O-CH_2-\underset{\underset{CH_3}{\|}}{\overset{\overset{CH_3}{\|}}{C}}-CH_2OH$ |
| 10 | $C_6H_5$ | —$CH_2CH_2$— | 10 min | −78 | 100 | $C_6H_5-\overset{O}{\underset{\|}{C}}-O-CH_2CH_2OH$ |

EXAMPLE 11

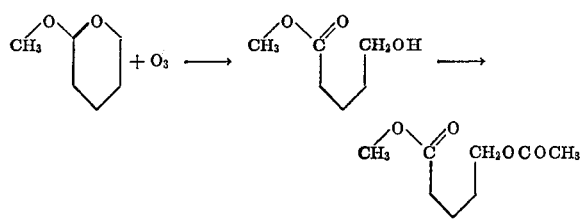

2-Methoxy tetrahydropyrane (5.58 g., 48.2 mmoles) dissolved in ethyl acetate was ozonized for 2 hours at −78° C. The excess ozone was swept away with a stream of nitrogen while the reaction mixture was allowed to warm up to room temperature. After evaporation of the solvent the crude product (methyl 5-hydroxy pentanoate) was characterized as its acetate derivative by acetylation with acetic anhydride (10 ml.) and pyridine (10 ml.) for 15 hours at room temperature. The excess reagents were removed *in vacuo* and the residue dissolved in ether. The ethereal solution was washed with 5% sodium carbonate, brine, dried over magnesium sulfate, filtered and evaporated to dryness. Methyl 5-acetoxy-pentanoate was obtained by distillation (7.85 g., 45.1 mmoles, 93.8% yield; b.p. 84° C./10 mm.).

*Analysis.*—Calculated: C, 55.16; H, 8.10. Found: C, 55.06; H, 8.05.

EXAMPLE 12

Employing the method described in Example 11, but substituting for 2-methoxy tetrahydropyran used therein equivalent amounts of the acetal shown in Table III, there is produced according to Equation III the corresponding ester shown in Table III.

TABLE III

Equation III $\underset{R}{\overset{O\diagdown\diagup O}{\bigcirc}}$ + $O_3$ ⟶ $\underset{R}{\overset{O\diagdown\diagup O}{\bigcirc}}-OH$

| Ex. | R | Time, hrs. | Temp. (° C.) | Yield (percent) | Ester |
|---|---|---|---|---|---|
| 12 | $C_6H_{13}$ | 2 | −78 | 91 | $\underset{C_6H_{13}}{\overset{O\diagdown\diagup O}{\bigcirc}}-OH$ |

EXAMPLE 13

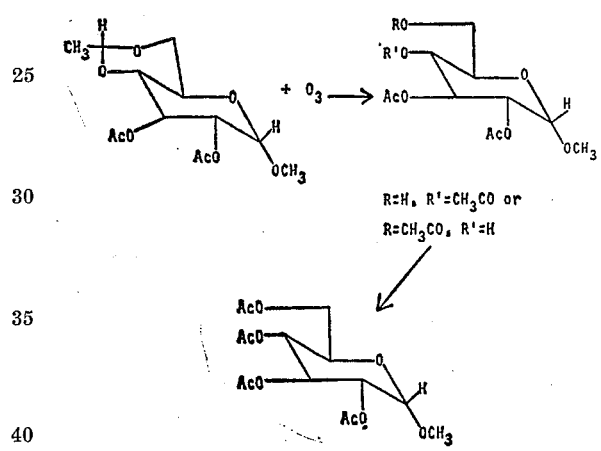

R=H, R'=CH₃CO or
R=CH₃CO, R'=H

Methyl 4,6 - O-ethylidene-2,3-di-O-acetyl-α-D-glucopyranoside (940 mg., 3.09 mmoles) dissolved in acetic anhydride (100 ml.) containing sodium acetate (4 g.) was ozonized at room temperature for 2 hours. The excess ozone was swept away with a stream of nitrogen. The mixture was heated to reflux for 2 hours after which the acetic anhydride was evaporated *in vacuo*. The residue was dissolved in water and the mixture was extracted with ether. The ether solution was washed with 5% aqueous sodium carbonate, brine, dried with magnesium sulfate, filtered and evaporated to dryness. The crude product (1.303 g.) was chromatographed on silica gel column. Elution with ether gave pure methyl 2,3,4,6-tetra-O-acetyl-α-O-glucopyranoside (1.109 g., 98%, m.p. 99–100° C.) which was identified by comparison with an authentic sample.

EXAMPLE 14

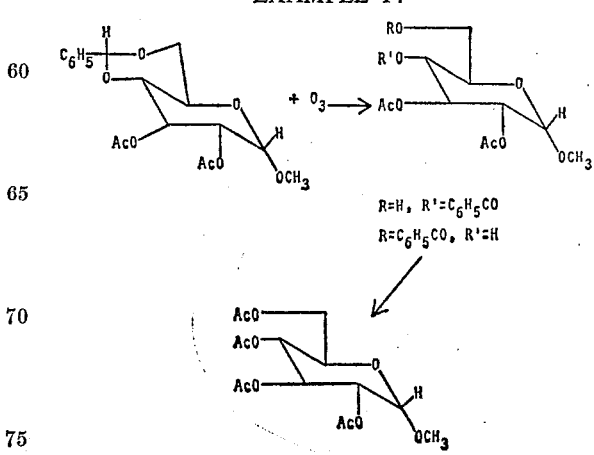

R=H, R'=C₆H₅CO
R=C₆H₅CO, R'=H

Methyl 4,6-O-benzlidene 2,3-di-O-acetyl-α-D-glucopyranoside (150 mg.) dissolved in glacial acetic acid (100 ml.) was ozonized during 1 hour. The solvent was evaporated to dryness in vacuo and the crude product was dissolved in a mixture of methanol-water (3:7 ratio, 90 ml.) and triethylamine (6 ml.). The mixture was left at room temperature for 12 hours and was evaporated to dryness. The crude product was mixed with acetic anhydride (60 ml.) and sodium acetate (15 g.) and heated for 2 hours at 100° C. The solvent was removed in vacuo, water was added and the mixture extracted with ether. The ether extract was washed with 5% aqueous sodium carbonate, brine, dried over magnesium sulfate and evaporated to dryness. The crude product (171 mg.) was purified by preparative thin layer chromatography using silica gel. Elution with ether gave pure methyl 2,3,4,6-tetra-O-acetyl-α-D-glucopyranoside (80 mg.).

What is claimed is:

1. A process for converting an acetal to an ester, which consists essentially of subjecting to ozonolysis an acetal of the formula:

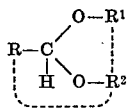

wherein: R, R¹ and R² are independent radicals selected from alkyl of 1 to 9 carbon atoms, phenyl, naphthyl, styryl, benzyl, phenethyl or cycloalkyl of 3 to 6 carbon atoms, R¹ and R² may form an alkylene chain of 2 to 4 carbon atoms having up to 2 lower alkyl substituents and R and R² may form an alkylene chain of 2 to 5 carbon atoms.

2. A process for converting an acetal to an ester, which comprises subjecting to ozonolysis an acetal of the formula:

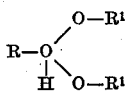

wherein: R and R¹ are independent radicals selected from alkyl of 1 to 9 carbon atoms, phenyl, naphthyl, styryl, benzyl, phenethyl or cycloalkyl of 3 to 6 carbon atoms, whereby there is formed an ester of the formula:

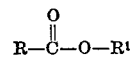

3. A process for converting an acetal to an ester according to claim 1 which consists essentially of subjecting to ozonolysis an acetal of the formula:

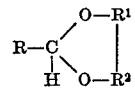

wherein R stands for a radical selected from alkyl of 1 to 9 carbon atoms, phenyl, naphthyl, styryl, benzyl, phenethyl or cycloalkyl of 3 to 6 carbon atoms, and R¹ and R² form an alkylene chain of 2 to 4 carbon atoms having 0 to 2 lower alkyl substituents whereby there is formed an ester of the formula:

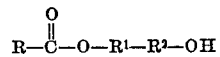

4. A process for converting an acetal to an ester which consists essentially of subjecting to ozonolysis an acetal of the formula

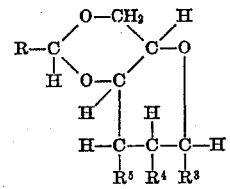

where R stands for a radical selected from alkyl of 1 to 9 carbon atoms, phenyl, naphthyl, styryl, benzyl, phenethyl or cycloalkyl of 3 to 6 carbon atoms, and R³, R⁴ and R⁵ each are H, methoxy, or acetyl whereby there is formed an ester of the formula:

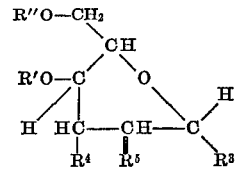

where R' is R or H and R'' is H when R' is R and R'' is R when R' is H.

5. A process according to claim 4 wherein the acetal is methyl 4,6-O-ethylidene or benzylidene 2,3-di-acetyl-α-D-glucopyranoside.

6. A process for converting an acetal to an ester according to claim 1 which consists essentially of subjecting to ozonolysis an acetal of the formula:

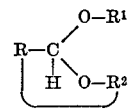

where R¹ is a radical selected from alkyl of 1 to 9 carbon atoms, phenyl, naphthyl, styryl, benzyl, phenethyl or cycloalkyl of 3 to 6 carbon atoms and R and R² form an alkylene chain of 2 to 5 carbon atoms whereby there is formed an ester of the formula:

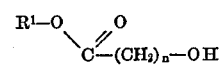

$n$ is 2 to 5.

7. A process according to claim 6 where $n$ is 4.

8. The process according to claim 2, wherein R¹ and R are alkyl radicals of 1 to 9 carbon atoms.

9. The process according to claim 3 wherein R¹ and R² form an alkylene chain having from 2 to 4 carbon atoms.

10. The process according to claim 3 wherein R¹ and R² form an alkylene chain having from 2 to 4 carbon atoms and substituted by 1 to 2 methyl groups.

11. The process according to claim 6 wherein R and R² form an alkylene chain having 4 carbon atoms and R¹ is a lower alkyl.

12. The process according to claim 6 wherein R and R² form an alkylene chain having 4 carbon atoms and R¹ is a cycloalkyl of 3 to 6 carbon atoms.

13. A process for converting an acetal to an ester according to claim 3 wherein R¹ and R² form an alkylene chain having 2 to 4 carbon atoms or such an alkylene chain having a lower alkyl substituent.

References Cited

UNITED STATES PATENTS 3,641,075　2/1972　Cobb _____ 260—496

OTHER REFERENCES

Schmidt et al.: "Chem. Abst.," vol. 58, 1963, p. 2365(d).

JOHNNIE R. BROWN, Primary Examiner

U.S. Cl. X.R.

260—234 R, 410.6, 468 R, 476.9, 484 A, 484 R, 494, 496